May 26, 1964  D. J. LEECH ETAL  3,134,240
VAPOUR CYCLE REFRIGERATION SYSTEM
Filed Jan. 23, 1961  4 Sheets-Sheet 1

INVENTORS
DONALD J. LEECH
DESMOND F. J. QUICK
BY Larson and Taylor
ATTORNEYS

INVENTORS
DONALD J. LEECH
DESMOND F.J. QUICK

INVENTORS
DONALD J. LEECH
DESMOND F. J. QUICK
BY Larson and Taylor
ATTORNEYS

INVENTORS
DONALD J. LEECH
DESMOND F.J. QUICK

3,134,240
VAPOUR CYCLE REFRIGERATION SYSTEM
Donald J. Leech, Melbury Osmond, Dorchester, and Desmond F. J. Quick, Yeovil, England, assignors to Normalair Limited, Yeovil, England
Filed Jan. 23, 1961, Ser. No. 84,375
Claims priority, application Great Britain Jan. 30, 1960
11 Claims. (Cl. 62—181)

This invention relates to a temperature control system for an aircraft enclosure for use although not exclusively with aircraft of the passenger carrying type.

It is an object of the invention therefore to provide in a temperature control system, a vapour cycle refrigeration system for aircraft incorporating apparatus of comparatively light weight which may be readily disconnected from the aircraft for servicing and replacement of spare parts.

It is a further object of the invention to provide in a temperature control system a vapour cycle refrigeration system for aircraft incorporating a recirculating system having positioned therein a drier of small dimensions and weight for drying the refrigerant in the system.

According to the invention in a temperature control system for an aircraft enclosure, a closed circuit vapour cycle refrigeration system having heat exchange means associated with moisture extraction means for cooling and drying air being passed to said enclosure, a first turbine driving a compressor of said refrigeration system said first turbine operated by air flow through a first duct from a source of pressurized air, air moving means driven by a second turbine operated by air flow through a second duct from a source of pressurized air to cool a condensing means of said refrigeration system.

The invention consists in a refrigeration system according to the preceding paragraph comprising in conduit combination one with another said compressor, said condensing means, expansion valve means and said heat exchange means.

The invention also consists in a refrigeration system according to the two preceding paragraphs wherein said heat exchange means comprise an evaporator having compressor speed modulating means in conduit communication with the outlet therefrom for regulating the speed of said first turbine and hence the compressor speed and evaporating temperature of the system in accordance with the heat load of the enclosure.

The invention also consists in a refrigeration system according to the preceding paragraph, wherein said compressor speed modulating sensing means is also actuated by way of electrically operated actuating means from signals obtained from said temperature control system to regulate the evaporating temperature of the system and thereby maintain a constant temperature within the enclosure.

The invention also consists in a refrigeration system according to the preceding paragraph, wherein said compressor speed modulating sensing means regulate first valve means disposed within said first duct thereby controlling air flow from engines of said aircraft to said first turbine.

The invention also consists in a temperature control system for an aircraft enclosure, the installation of a closed circuit vapour cycle refrigeration system wherein disconnect means are provided to facilitate installation and removal of a refrigeration pack from said aircraft.

The invention also consists in an aircraft embodying temperature control means according to any of the preceding paragraphs and as hereinafter to be described.

Further objects and advantages of the invention will become apparent from the following detailed description of the invention with reference to the accompanying drawings.

Referring to the accompanying drawings.

Figure 1:
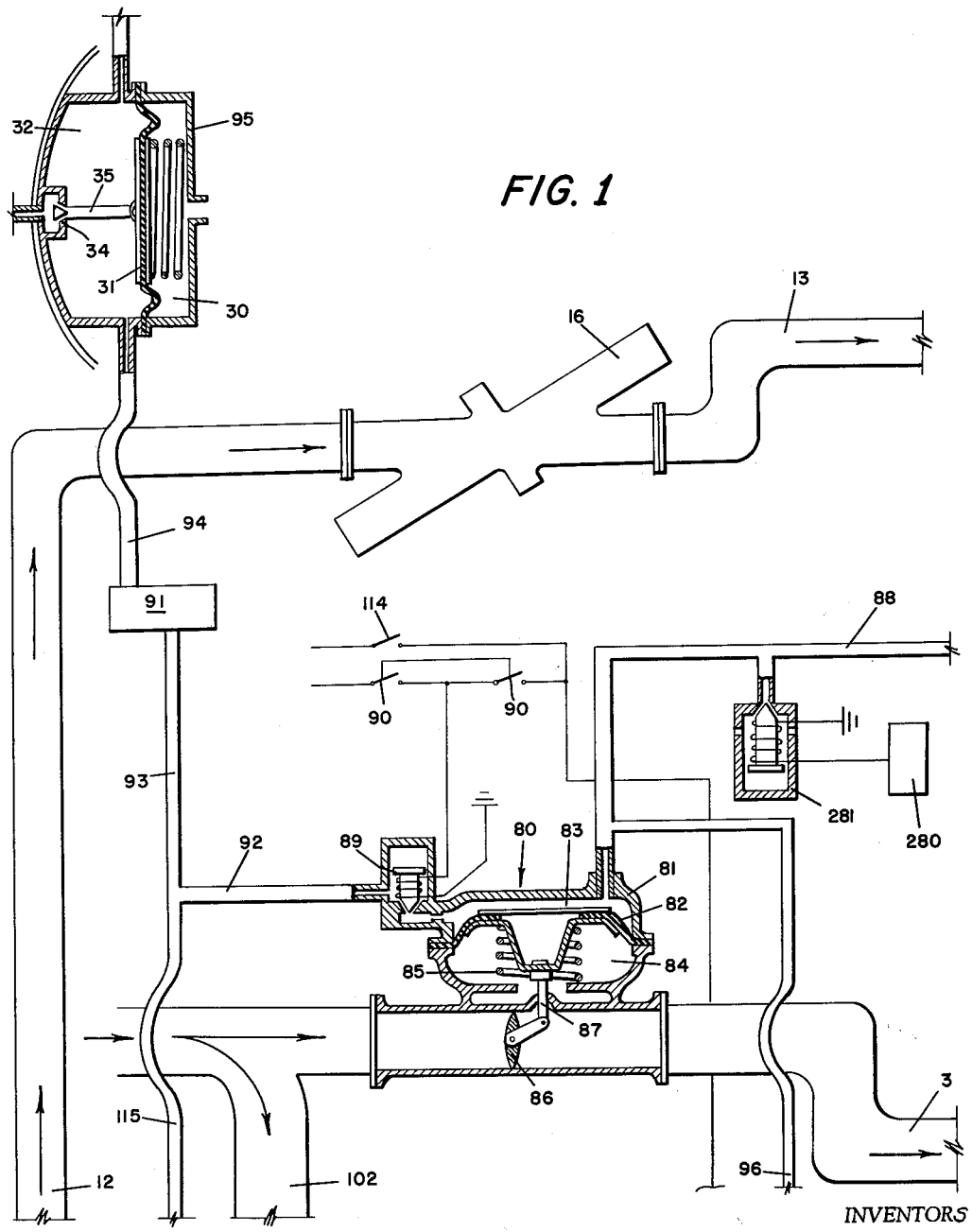
FIGURE 1 shows the top left hand portion of the refrigeration system.
Figure 2:
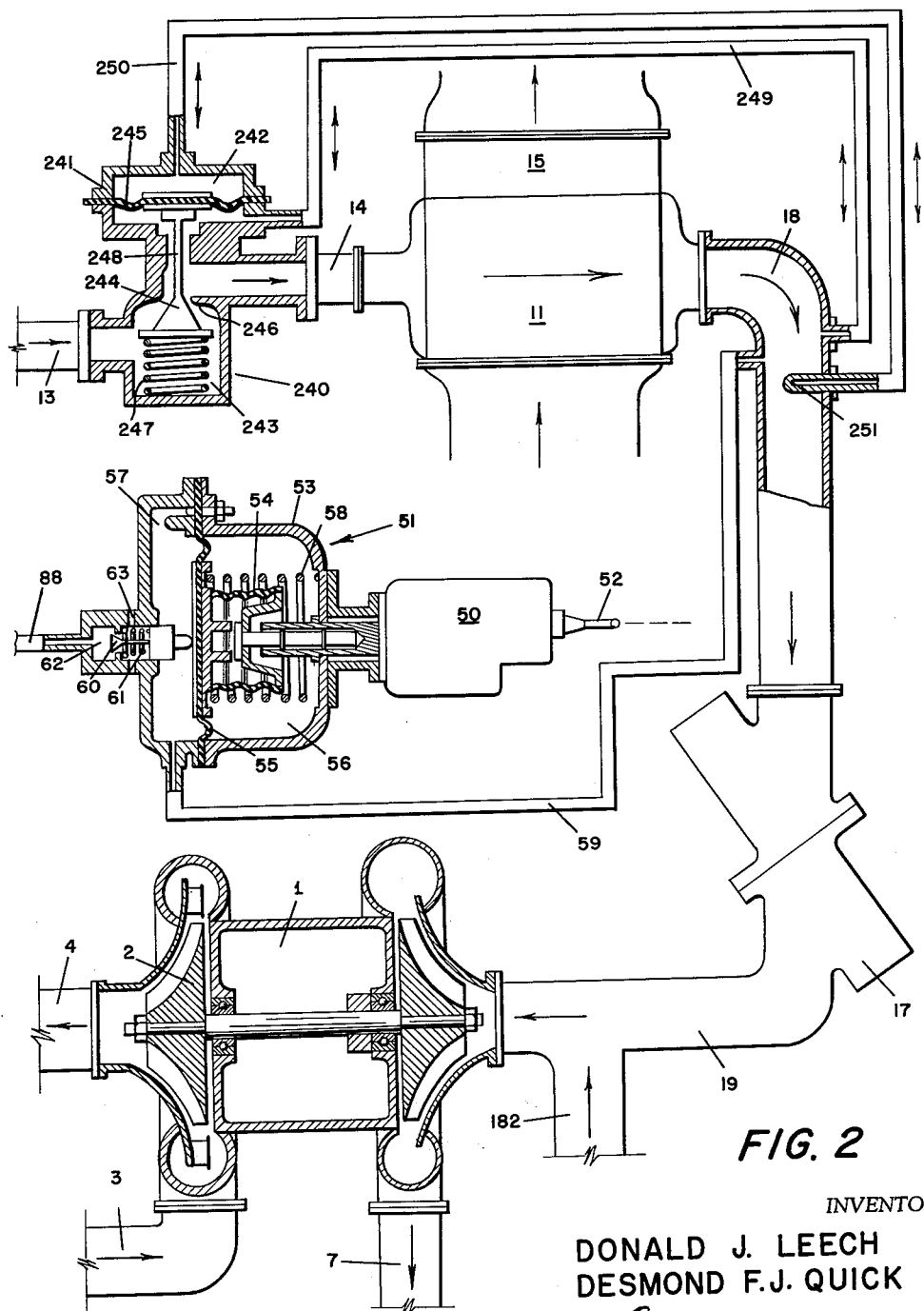
FIGURE 2 shows the top right hand portion of the refrigeration system.
Figure 3:
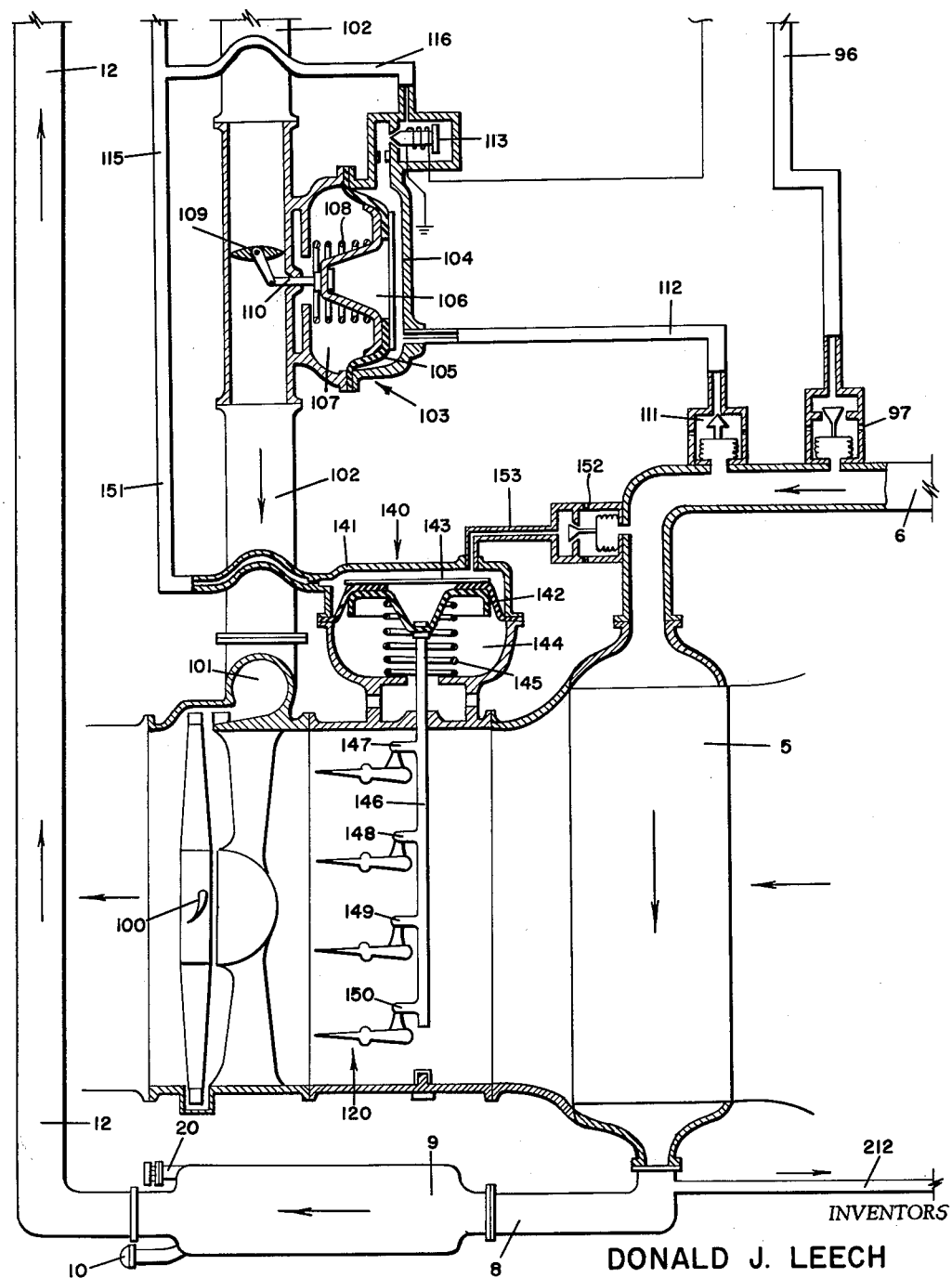
FIGURE 3 shows the bottom left hand portion of the refrigeration system.
Figure 4:
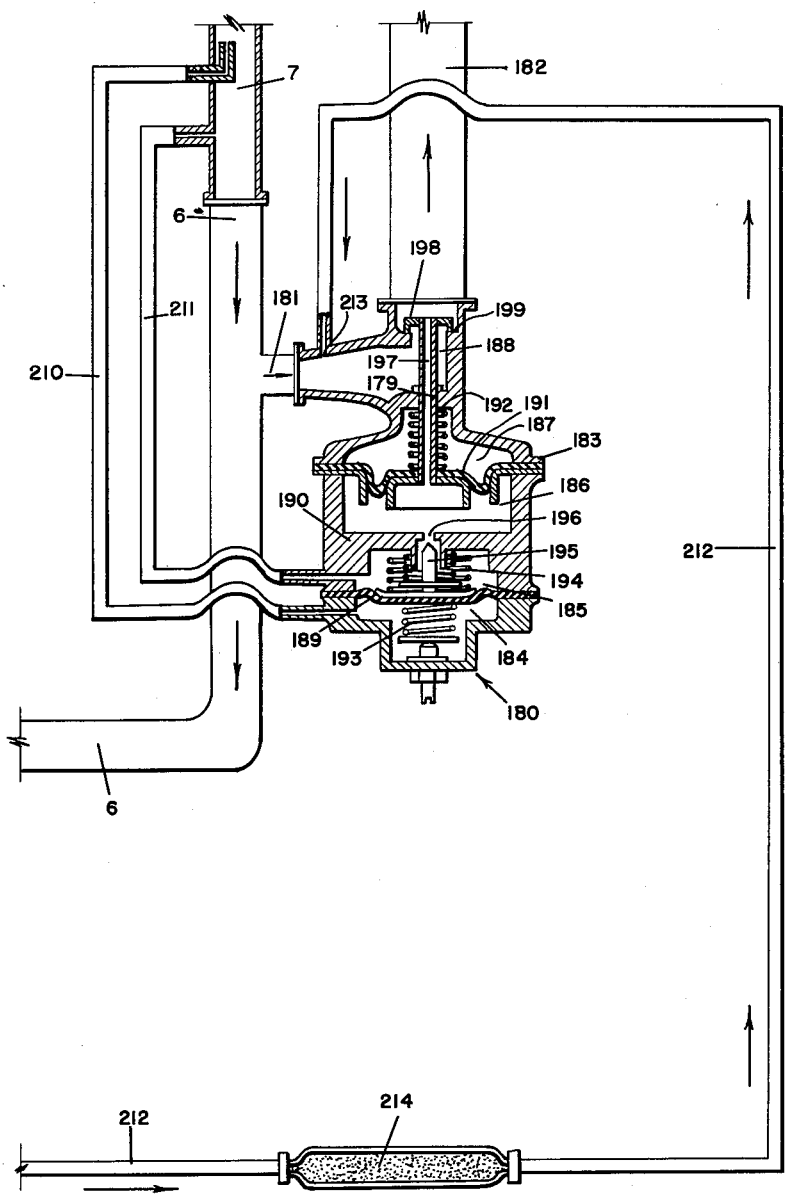
FIGURE 4 shows the bottom right hand portion of the refrigeration system.

In one arrangement by way of example embodying the present invention with reference to the accompanying drawings, used in conjunction with each other, we provide a cooling system using a solution of dichlorotetra fluoroethane a refrigerant, hereinafter referred to as the refrigerant, comprising a compressor generally indicated at 1, diven by a turbine 2 by way of airflow from a source of pressurized air through a conduit 3, said airflow leaves turbine by way of a conduit 4. The high pressure air which passes through conduit 3 may be derived from any convenient source in the aircraft. For instance, a compressor could be mounted so as to be driven by the aircraft engine to supply the high pressure air. Alternatively, many engines include areas of high pressure air which could be conveniently be tapped to provide the driving fluid for turbine 2. The particular source from which the driving air is obtained is not an important element of this invention, so long as the driving fluid is produced in the aircraft, preferably by the main engines. The compressor 1 is in communication with a condenser 5 by way of a conduit 6 having positioned therein a metering head 7. Condenser 5 also communicates by way of conduit 8 with a liquid receiver 9 having positioned therein a service valve 10, for filling and emptying the system of refrigerant or for providing means for attaching thereto a pressure or temperature sensing device for determining the pressure or temperature therein. The receiver 9 is also provided with a bursting disc 20, said receiver 9 is in communication with an evaporator 11 by way of conduits 12, 13 and 14. Adjacent to and in communication with said evaporator is situated a water eliminator 15 and between conduits 12 and 13 is disposed a stop valve 16, a further stop valve 17 is provided between a conduit 18 and a conduit 19. The purpose of the stop valve 16 and 17 is to provide means for quickly disconnecting the "pack" from the aircraft and in so doing provide simple means for sealing the "pack" and the remainder of the installation i.e. the evaporator, expansion valve and associated pipe work at the open ends so formed.

An electrical actuator indicated at 50 receives an electrical signal from the temperature control system (not shown) by way of electrical conduit 52. The actuator 50 is in communication with a compressor speed modulating sensor 51 comprising a housing 53 having positioned therein a pressure sensing bellows 54 in communication with a diaphragm 55, said diaphragm 55 divides interior of housing 53 into two compartments indicated at 56 and 57, and is urged by spring 58 towards compartment 57. Compartment 57 communicates with conduit 18 at outlet of evaporator 11 by way of a conduit 59 and diaphragm 55 tends to deflect due to pressure sensed from conduit 18 tending to allow valve 60 sliding in a sealing manner within housing 53 to open against force in spring 61. An orifice 63 is provided within casing 53 allowing valve chamber 62 to bleed to ambient atmosphere when valve 60 is in the open position. The purpose of the actuator 50 is to vary the setting of the sensor 51 in manner to be hereinafter described.

A turbine control valve generally indicated at 80 is provided on conduit 3 and comprises a housing 81 having positioned therein a diaphragm 82, said diaphragm 82 divides interior of housing 81 into two compartments indicated at 83 and 84. Diaphragm 82 is urged towards compartment 83 by way of spring 85 and is connected to a butterfly valve 86 positioned within conduit 3 by way of push rod 87. Compartment 83 receives signal pressure from valve chamber 62 provided within actuator 51, by way of a conduit 88 tending to cause diaphragm 82 to deflect and cause butterfly valve 86 to open or close. Also provided within the housing 81 is a solenoid operated valve 89 actuated by a selector switch 90. Upon opening valve 89 communication is provided between a pressure reducing valve 91 and compartment 83 by way of conduit 92 and conduit 93. Pressure reducing valve 91 is in communication with a high pressure bleed (not shown) from a compressor driven by the engines of the aircraft by way of conduit 94 and an air drier 95 mounted on the skin of the aircraft for the purpose of drying the bleed air. The air drier 95 comprises a container 30 having a spring biased diaphragm 31 disposed therein and dividing the container into two compartments 32 and 33. Container 32 is in communciation with atmosphere by way of an orifice 34 controlled by a valve member 35 operated by the diaphragm 31. The drier 95 is positioned against the cold skin of the aircraft and moisture condenses on the cold surface of compartment 32. When the pressure within compartment 32 decreases, the spring biased diaphragm 31 urges the valve member 35 away from its seat and the condensate within compartment 32 is expelled by way of orifice 34.

The high pressure bleed supplies additional bias to diaphragm 82 provided within housing 81 by way of a conduit 96 connecting compartment 83 to an overload sensor 97 which senses pressure within conduit 6.

A fan 100, provided for drawing air over the condenser 5, is driven by a turbine 101 by way of airflow from the high pressure source through a conduit 102, said conduit 102 having positioned therein a turbine control valve generally indicated at 103. The control valve comprises a housing 104 having positioned therein a diaphragm 105, which divides interior of housing 104 into two compartments indicated at 106 and 107. Diaphragm 105 is urged towards compartment 106 by way of a spring 108 and connected to a butterfly valve 109 positioned within conduit 102 by way of push rod 110. Compartment 106 receives signal pressure from a pressure sensing head 111 by way of conduit 112 which senses pressure within conduit 6 and thereby tends to cause diaphragm 105 to deflect and cause butterfly valve 109 to open or close. Also provided within housing 104 is a solenoid operated valve 113 which may be actuated by an undercarriage and crew's selector switch 114 or selector switch 90. Upon opening valve 113, communication is provided between pressure reducing valve 91 and compartment 106 by way of conduits 93, 115 and 116.

A series of pivotally mounted shutters generally indicated at 120 are disposed between fan 100 and condenser 5, and depend for actuation on a shutter control 140 comprising a housing 141 having positioned therein a diaphragm 142 dividing the interior of said housing into two compartments 143 and 144. Diaphragm 142 is urged towards compartment 143 by way of a spring 145 and is connected to said shutters 120 by way of a connecting rod 146. The rod 146 is pivotally connected to each individual shutter at pivot point 147, 148, 149 and 150. Compartment 143 receives a signal pressure from reducing valve 91 by way of conduits 93, 115 and a further conduit 151, additional bias is supplied to diaphragm 142 from a condenser pressure sensing head 152 which senses pressure within conduit 6 at inlet to condenser 5, by way or conduit 153 and upon opening of solenoid valve 113, further bias is provided to said diaphragm 142 from pressure sensing head 111 by way of conduits 112, 116 and 151.

A surge control valve generally indicated at 180 is in communication with conduit 6 by way of conduit 181 provided downstream of said metering head 7. A further conduit 182 forms communication between the outlet of said control valve 180 and conduit 19 upstream of said compressor 1.

The control valve 180 comprises a casing 183 divided interiorly into five compartments 184, 185, 186, 187 and 188 by way of a diaphragm 189, a dividing member 190, a diaphragm 191, and a further dividing member 192. Diaphragm 189 is biased by way of springs 193 and 194 and carries a valve member 195 adapted to effect closure of an orifice 196 diametrically disposed within dividing member 190. Diaphragm 191 is spring urged towards compartment 186 and carries a push rod 197 provided at the end remote from the diaphragm with a valve 198 adapted to engage with a valve seat 199 at outlet to said control valve 180. Sliding sealing engagement is provided in dividing member 192 by way of guide bore 179.

A pressure differential is set up across diaphragm 189 by way of pressures within compartments 184 and 185 from conduits 210 and 211 respectively, which sense pressures in the metering head 7 at varying radii therein.

A conduit indicated at 212 forms communication between conduit 8 at outlet of condenser 5 and inlet 213 of said surge control valve 180, thus allowing liquid refrigerant leaving condenser 5 to be fed back to the control valve 180 and eventually all the refrigerant in the system will be re-circulated in this manner. A small drier 214 is therefore placed within conduit 212 and upon the re-circulating phase taking place, will eventually dry all the refrigerant in the system, thus eliminating the need for the usual drier of large dimensions to be placed within the system.

An expansion valve generally indicated at 240 is disposed between conduit 13 and conduit 14 and comprises a casing 241 divided interiorly into two compartments 242 and 243 by way of diaphragm 245. A valve 244 is provided with a valve stem 248 which connects valve 244 with diaphragm 245, valve 244 is urged towards a valve seat 246 and compartment 242 by way of a spring 247.

A pressure differential is set up across diaphragm 245 by way of pressure within compartments 242 and 243 from conduit 249 which sense pressures in the conduit 18 at outlet to said evaporator 11, and conduit 250 which senses the true vapour pressure corresponding to the degree of superheat at outlet to said evaporator 11 by way of phial 251.

An overspeed amplifier 280, adapted to be actuated upon the compressor 1 attaining a predetermined danger speed of rotation, is connected to a solenoid operated switch 281 communicating with conduit 88 disposed betweeen actuator 51 and the control valve 80.

In operation of the invention, when the aircraft is on the ground, the refrigerant leaves the compressor 1 operated by turbine 2, in a gaseous state at a substantially high temperature and pressure and flows to the condenser 5 by way of conduit 6 where it liquefies and cools, the heat of liquefaction being transferred to the ram in drawn over the condenser 5 by way of fan 100 driven by turbine 101. The liquid refrigerant then passes to the liquid receiver 9 by way of conduit 8; the liquid receiver 9 holds a reserve supply of liquid refrigerant which may augment the liquid refrigerant already in the system. Upon leaving the liquid receiver 9 by way of conduit 12, the refrigerant passes to the expansion valve 240 via stop valve 16 and conduit 13, where it partially vapourises cooling to a substantially low temperature with a corresponding reduction in pressure. The pressures sensed by conduits 248 and 249 form a bias across diaphragm 245 provided within expansion valve 240, tending to deflect diaphragm 245 and varying the flow through expansion valve 240 by opening or closing valve 244.

The refrigerant on leaving expansion valve 240, flows to the evaporator where it is entirely converted to gas. The purpose of the expansion valve 240 is to regulate the quantity of refrigerant passing to the evaporator 11 in such a manner that no liquid leaves the evaporator and further that an adequate supply of liquid refrigerant is available in the evaporator. Cabin air which passes through the evaporator 11 is cooled by evaporation of the refrigerant in the evaporator 11 and is dried by way of the water eliminator 15 which may comprise a water extractor of the baffle or swirl type provided with drainage means.

The refrigerant is then returned to compressor by way of conduit 18, stop valve 17 and conduit 19 from whence the cycle is repeated.

The compressor speed modulating sensor 51 senses the absolute pressure in conduit 18 at outlet to evaporator 11 by way of conduit 59 which sets up a bias across the diaphragm 55, causing the diaphragm 55 to deflect by an amount controlled by the pressure sensing bellows 54 and force in spring 58 and allows valve 60 to open or close opposing or assisting force in spring 60. Upon valve 60 being placed in the open position, pressure from compartment 83 is bled to ambient by way of conduit 88, valve chamber 62 and orifice 63 allowing diaphragm 82 to deflect and close butterfly valve 86 provided within conduit 3, reducing the flow of air to the turbine 2 from the engine thus decreasing the operational speed of the compressor.

Conversely, upon closure of valve 60, pressure will build up within chamber 83 and diaphragm 82 will tend to deflect in the opposite direction causing butterfly valve to open thus increasing the flow of air to the turbine 2. By this means a given temperature and pressure is maintained in the refrigerant upon leaving the evaporator. This temperature and pressure is further regulated by the overload sensor 97, which bleeds the pressure from compartment 83 allowing the butterfly valve 86 to tend to close as hereinbefore described.

The operational cooling temperature of the system is dependent upon the speed of operation of the compressor 1 by way of turbine 2 as hereinbefore described. This is accomplished by regulating the flow of air from the high pressure source to the turbine 2 by way of butterfly valve 86 actuated by sensor 51. As hereinbefore described, setting of the sensor 51 is controlled by actuator 50 which automatically adjusts the setting of the sensor 51 in such a manner by electrical signals from the temperature control system, that the cabin is maintained at a constant temperature.

If it is desired to close down the whole system, the crew member closes the selector switch indicated at 90 which causes the solenoid operated valves 89 and 113 to close and shut-off the high pressure bleed to compartments 83 and 106, allowing the butterfly valves 86 and 109 to close completely. This state is maintained until the selector switch 90 is opened.

If the flow of refrigerant in conduit 6 falls below a critical minimum the compressor 1 will tend to surge. To overcome this eventuality, the critical flow is sensed within the metering head 7 by the conduits 210 and 211 which cause diaphragm 189 disposed within the control valve 180 to deflect and allow valve 195 to open orifice 196. A pressure build-up takes place in compartment 186 which tends to deflect diaphragm 191 towards dividing member 192, urging valve 198 away from valve seat 199 by way of push rod 197 and thus allowing the flow of refrigerant from conduit 6 to be re-circulated to compressor inlet by way of conduits 181 and 182, thereby feeding an increased flow to the compressor 1.

To prevent overheating in conduit 181, liquid refrigerant, upon leaving condenser 5 is fed back to conduit 181 from conduit 8 by way of conduit 212.

At altitude and in cold climates it will be appreciated that a full flow of ram air drawn over condenser 5 by way of fan 100 would cool the refrigerant to a stage where sufficient pressure would not be available to operate the system. We therefore provide a series of shutters indicated at 120, the purpose of which is to regulate the flow of ram air to maintain the necessary condensing pressure. This pressure is sensed by the condenser pressure sensing head 152 which bleeds to ambient pressure, the pressure in compartment 143 provided within shutter control 140, allowing diaphragm 142 to deflect due to force in spring 145 and rotate shutters 120 towards the closed position by way of rod 146, thus regulating the flow of ram air drawn over condenser 5 by way of fan 100.

On the ground as hereinbefore described, air is drawn over the condenser 5 by way of fan 100, the fan speed depends upon the airflow to the turbine 101 by way of conduit 102. This flow of air is regulated by butterfly valve 109 which depends for its operation on the pressure differential set up across diaphragm 105 within turbine control valve 103. The position of diaphragm is determined by pressure being bled from compartment 106 by way of the pressure sensing heat 111, which senses the pressure within conduit 6.

At altitude, generally speaking, a sufficient flow of ram air is provided due to the forward motion of the aircraft, thus upon take-off the undercarriage and crew selectors' switch 114 is automatically closed which causes solenoid operated valve 113 to close and shut off the high pressure bleed to bleed compartment 106, allowing diaphragm 105 to deflect due to force in spring 108 thus causing butterfly valve to close, thereby cutting off the airflow to the turbine 101 and hence causing the fan to "windmill."

If however, it is found that the forward motion of the aircraft does not produce a sufficient flow of ram air over condenser 5, the fan may be made operational by a member of the crew opening the selector switch 114 thereby opening solenoid valve 113 and causing pressure to build-up in compartment 106 of control valve 103, thus opening butterfly valve 109 and allowing air to flow from the engine to operate the turbine 101 and consequently the fan 100 as hereinbefore described.

If the speed of rotation of the compressor 1 exceeds a predetermined maximum the overspeed amplifier 280 opens the solenoid operated switch 281 bleeding compartment 83 of turbine control valve 80 to ambient pressure thus causing the butterfly valve 86 to close, as hereinbefore described, thus shutting off the supply of air from the engine to the turbine 2. The compressor 1 ceases to rotate and remains in this condition indefinitely until examined and repaired.

We claim as our invention:

1. In an air conditioning system for an aircraft enclosure, a closed circuit vapour cycle refrigeration system comprising: a first compressor; a first turbine for driving said first compressor; means for producing a continuous source of high pressure fluid; a first duct leading from said source to said first turbine for supplying driving fluid to said first turbine; condensing means having an inlet communicating with the outlet of said first compressor; a second duct leading from the outlet of said condensing means and having an expansion valve therein; heat exchange means comprising an evaporator connected at its refrigerant inlet to said second duct beyond said expansion valve; said evaporator having an inlet and an outlet for passing air therethrough, the air outlet of said evaporator being adapted to supply air to the aircraft enclosure; a third duct leading from the refrigerant outlet of said evaporator to the inlet of said first compressor; a first valve in said first duct between said source of high pressure fluid and said first turbine; compressor speed modulating means responsive to pressure in the refrigerant outlet of said evaporator for regulating the speed of said first turbine and said first compressor by controlling said first valve in said first duct; air moving means comprising a fan driven by a second turbine for passing cooling air over said condensing means; and a fourth duct for leading high pressure fluid from said source to said second turbine for driving said turbine.

2. A refrigeration system as recited in claim 1 wherein said heat exchange means includes moisture extraction means located on the air outlet side of said evaporator for drying air being passed to the enclosure; and further including electrical actuating means responsive to the temperature of the enclosure for actuating said compressor speed modulating means to regulate said first valve in said first duct.

3. A refrigeration system as recited in claim 1 further including condensing regulating means comprising a series of pivotal shutters disposed between said condensing means and said air moving means, and means responsive to refrigerant pressure on the inlet side of said condensing means for actuating said pivotal shutters to regulate the flow of cooling air over said condensing means.

4. A refrigeration system as claimed in claim 1, and further including a first recirculation system, having inlet means and outlet means disposed relatively upstream and downstream of said first compressor, to provide an increased flow of refrigerant to said first compressor in the event of normal flow thereto falling below a critical minimum, and surge control means actuated by changes in pressure sensed at the outlet to said first compressor for regulating said recirculation system.

5. A refrigeration system as claimed in claim 1, and further including a recirculation system having drying means of small dimensions disposed between the outlet of said condensing means and upstream of said first compressor for continuously recirculating and drying portions of the refrigerant.

6. In an air conditioning system for an aircraft enclosure, a closed circuit vapour cycle refrigeration system comprising in conduit combination one with another; a first compressor driven by a first turbine operated by air flow through a first duct from a source pressurized by the engines of the aircraft; condensing means having associated therewith condensing regulating means; expansion valve means and heat exchange means having associated therewith moisture extraction means for cooling and drying air being passed to said enclosure; said heat exchange means defining an evaporator having compressor speed modulating means for sensing refrigerant pressure at the outlet of the evaporator and regulating the speed of said first turbine and hence the speed of said first compressor; air moving means comprising a fan driven by a second turbine adapted to cool said condensing means and operated by air flow through a second duct from said source; and electrically operated means for actuating said compressor speed modulating means in response to the temperature of the aircraft enclosure to thereby maintain a constant temperature within said enclosure, the speed of said first compressor being directly controlled by regulation of the airflow through said first duct to said first turbine by first valve means disposed therein and actuated by said compressor speed modulating means.

7. A refrigeration system as claimed in claim 6, wherein said first valve means controlling air flow in said first duct and actuated by said compressor speed modulating means is regulated according to pressure sensed upstream of said condensing means by way of a second pressure sensing means disposed at the inlet thereto; and a first solenoid operated valve means responsive to a predetermined maximum speed of said first compressor for closing said first valve means.

8. In an air conditioning system for an aircraft enclosure, a closed circuit vapour cycle refrigeration system comprising in conduit combination one with another; a first compressor driven by a first turbine operated by air flow through a first duct from a source pressurized by the engines of the aircraft; condensing means having associated therewith condensing regulating means; expansion valve means and heat exchange means having associated therewith moisture extraction means for cooling and drying air being passed to said enclosure; said heat exchange means defining an evaporator having compressor speed modulating means sensing refrigerant pressure at the evaporator outlet and regulating the speed of said first turbine and hence the speed of said first compressor in accordance therewith; air moving means comprising a fan driven by a second turbine adapted to cool said condensing means and operated by air flow through a second duct from said source; second valve means for regulating air flow through said second duct to said second turbine, thereby controlling said air moving means and said condensing means, said second valve means being pneumatically actuated by signals received from a third pressure sensing means disposed at the inlet to said condensing means, and a manually controlled solenoid operated valve means for regulating said second valve means, thereby allowing said fan to "windmill" or to be driven by said second turbine.

9. In an air conditioning system for an aircraft enclosure, a closed circuit vapour cycle refrigeration system comprising: a first compressor; a first turbine for driving said first compressor; a first duct for leading high pressure fluid from a source of such fluid to the inlet of said first turbine; condensing means having an inlet communicating with the outlet of said first compressor; a second duct leading from the outlet of said condensing means and having an expansion valve therein; heat exchange means comprising an evaporator connected at its refrigerant inlet to said second duct beyond said expansion valve, said evaporator having an inlet and an outlet for passing air therethrough, the air outlet of said evaporator being adapted to supply air to the aircraft enclosure; a third duct leading from the refrigerant outlet of said evaporator to the inlet of said first compressor; a first valve in said first duct for regulating the flow of driving fluid to said first turbine; compressor speed modulating means responsive to pressure in the refrigerant outlet of said evaporator and to the temperature in the aircraft enclosure for regulating the speed of said first turbine and said first compressor by controlling said first valve in said first duct; air moving means comprising a fan driven by a second turbine for passing cooling air over said condensing means; a fourth duct for leading high pressure driving fluid from a source of such fluid to said second turbine for driving said second turbine; a second valve in said fourth duct for regulating the supply of driving fluid to said second turbine; means responsive to refrigerant pressure between said first compressor and said condenser for regulating said second valve; means responsive to refrigerant pressure between said first compressor and said condenser for closing said first valve when said refrigerant pressure reaches a predetermined maximum; condensing regulating means comprising a series of pivotal shutters disposed between said condensing means and said air moving means, and means responsive to refrigerant pressure on the inlet side of said condensing means for actuating said pivotal shutters to regulate the flow of cooling air over said condensing means.

10. A refrigeration system as recited in claim 9 further including means for recirculating a portion of the refrigerant from the outlet of said condenser to the inlet of said first compressor; and moisture extracting means in said last mentioned circulating means for drying the recirculated refrigerant.

11. A refrigeration system as recited in claim 9 wherein said first and second valves and said pivotal shutters are each actuated by spring loaded diaphragms, each of said diaphragms including an air chamber on at least one side thereof, and means for supplying pressurized fluid to each of said air chambers, said first and second valves and said pivotal shutters being regulated by varying the pressure in said air chambers.

References Cited in the file of this patent

UNITED STATES PATENTS

| | | |
|---|---|---|
| 2,398,655 | Mayer | Apr. 16, 1946 |
| 2,518,299 | Fernandez | Aug. 8, 1950 |
| 2,959,029 | Best | Nov. 8, 1960 |